April 19, 1949.    J. P. MARX    2,467,842
SETTING AND LOCKING FITTING
Filed June 25, 1945

INVENTOR.
JOSEPH P. MARX
BY
Elmer L. Zwickel
ATTORNEY

Patented Apr. 19, 1949

2,467,842

UNITED STATES PATENT OFFICE 2,467,842

SETTING AND LOCKING FITTING

Joseph P. Marx, Hartford, Wis.

Application June 25, 1945, Serial No. 601,527

6 Claims. (Cl. 287—58)

1

The invention relates to improvements in setting, and locking fittings and more particularly to a novelly constructed mechanism operable to secure telescoped members against relative movement in one direction.

The fitting of the present invention is primarily intended for use in securing inner and outer telescoped members, such as tubing, against relative movement into an increased telescoped relationship, but may be used readily in the leg construction of chairs, tables, stools and supporting structures for machines and the like.

An object of the present invention is to provide a fitting of the kind referred to which may be constructed inexpensively and easily assembled, and which may be manipulated easily and quickly with but a minimum amount of effort so as to effect its instant release to permit adjustment in the overall length of the member or members with which it is associated.

Another object of the invention is to provide a setting and locking fitting having novelly constructed latch elements adapted to wedgingly bind a movable member so as to prevent movement of said member in one direction while the elements are in clamping position.

Other and further objects of the present invention will be apparent from the following description and claims and are illustrated in the accompanying drawing which illustrates a preferred embodiment and the principle thereof, and which is considered to be the best mode contemplated for applying that principle. Other embodiments of the invention embodying the same or equivalent principle, may be used and structural changes may be made as desired by those skilled in the art, without departing from the spirit of the present invention and the purview of the appended claims.

Figure 1:
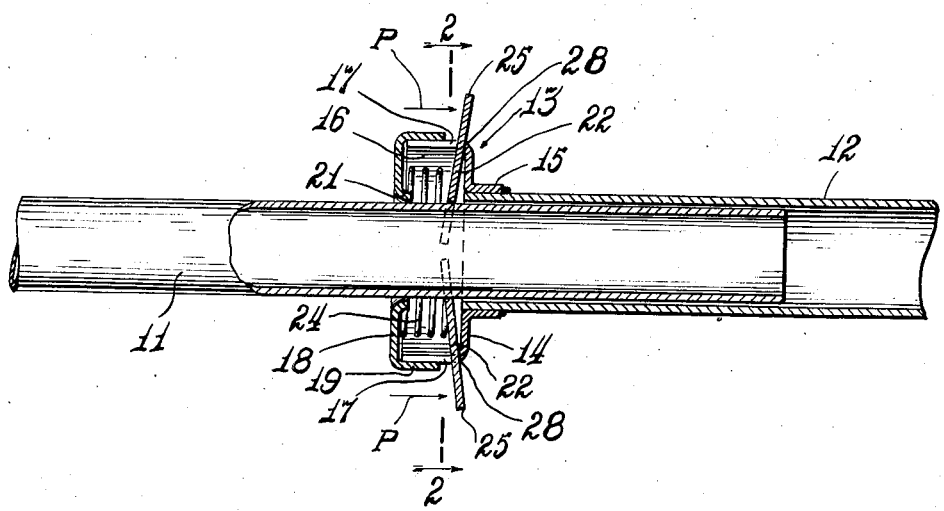
Fig. 1 is a longitudinally sectional view of fragmentary portions of two telescoped tubular members embodying a setting and locking fitting employing the features of the present invention.
Figure 2:
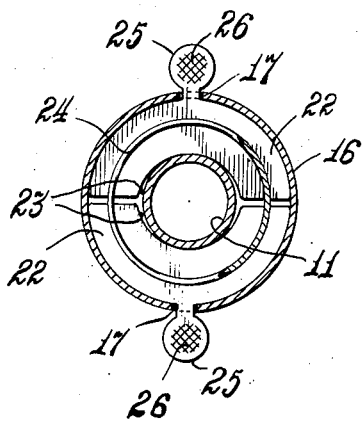
Fig. 2 is a transverse sectional detail view of the setting and locking fitting, taken on line 2—2 of Fig. 1.
Figure 3:
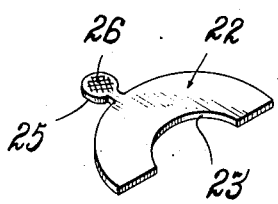
Fig. 3 is a perspetive view of one of the clamping elements.

The setting and locking fitting embodying the features of the present invention, is shown applied to a pair of telescoped tubular members 11 and 12, and it includes generally, a circular housing 13 adapted to contain movable elements cooperatively associated with said housing and with one of the tubular members for locking said tubular member against movement in one direction.

As shown, the housing member 13 includes a bottom wall 14 constituting an external annular flange firmly secured to one end of the outer telescope member 12. The inner edge of the bottom wall 14 terminates in an outwardly extending sleeve 15 having a snug fit over the outer tubular member 12 and secured thereto as by welding. The outer edge of the bottom wall 14 of the housing 13 terminates in a peripheral wall 16, which extends therefrom in a direction opposite to the direction of the internal flange 15, so as to provide a substantially circular cuplike element extending beyond the end of the outer tubular member 12. The peripheral wall 16 is provided with a pair of diametrically opposed slots 17 which extend from the free edge thereof to the bottom wall 14.

A ring-like cap 18 is fitted over the open end of the flanged housing portion, said cap having a circumferential flange 19 adapted to be pressfitted over the peripheral wall 16 and terminate with its free edge short of the wall 14 so as to leave a portion of the slots 17 open. The ring-like cap 18 is provided also with an internal circumferential flange 21 of a diameter substantially the same as, but slightly greater than, the outside diameter of the inner tubular member 11, so that said tubular member may be inserted freely through the flanged opening in the cap for telescoping within the outer tubular member 12.

The housing member 13, as described hereinabove, contains novel means to co-act with the innter tubular member 11 to prevent inadvertent movement of said inner tubular member 11. To this end, a pair of semi-circular clamping elements 22 are arranged within the housing 13, said elements having their inner curved edges 23 formed on a radius slightly greater than the radius of the inner tubular member 11 and having an overall width at the middle portion thereof slightly greater than the radial distance between the outer surface of the inner tubular member 11 and a corresponding surface on the inside face of the outer peripheral wall 16. This increased width of each semi-circular element 22 is such that when the elements are arranged within the housing 13, they normally lie at oblique angles relative to each other, with their inner curved edges 23 resting against the outside surface of the inner tubular member 11. A tension spring 24 is arranged within the housing 13 between the semi-circular clamping elements 22 and the ring-like cap 18, so as to normally urge said clamping elements towards a common plane so as to cause their inner edges 23 to bite firmly into the surface of the inner tubular member 11 and thereby prevent telescopic movement of said member into the outer tubular member 12.

When adjustment of the relative positions of the inner tubular member 11 and the other tubular member 12 is required, the clamping elements 22 are manipulated, in a manner to be described hereinafter, so as to overcome the action of the tension spring 24 and relieve their clamping engagement with the inner tubular member 11. Means for releasing the clamping elements 22 preferably is provided in the form of finger-pieces 25, provided one on each clamping element 22, which finger-pieces extend outwardly of the housing 13, one through each slot 17. It is preferred that a surface of each of the finger-pieces 25 be knurled or otherwise roughened, as at 26, to prevent the fingers of the operator from slipping therefrom.

It should be evident that when pressure is applied to the finger-pieces 25 in the direction of the arrows P, shown in Fig. 1, the clamping elements 22 are rocked over the contacting edge 28 of the bottom wall 14 of the housing, to thereby move the inner extremities thereof in the direction of the spring 24 and free the inner tubular member 11 for adjustment. Immediately upon release of pressure on the finger-pieces 25, the spring 24 returns the clamping elements to their initial locking position to thereby retain the inner tubular member 11 in its new position of adjustment.

It is submitted that the present invention is capable of embodying a variety of modifications and that the invention is not to be limited to the precise disclosure herein, but is to embrace such modifications as will fall within the spirit of the invention and the scope of the appended claims.

I claim:

1. In a structure of the character described, comprising an outer tubular member and an inner tubular member telescopically adjustable in one end of the outer tubular member, and means for securing said members in a desired position of telescopic adjustment, said means comprising a cup-shaped housing having diametrically opposed slots therein and surrounding the outer member at one end, a cap on said housing and through which the inner tubular member extends, a pair of diametrically opposed semi-circular segments surrounding said inner member and arranged in said cup-shaped housing at oblique angles relative to each other, a spring in said housing to normally urge said segments toward a common plane to cause their inner edges to bind on the outside surface of said inner member, and a finger piece on each segment each extending through a slot in said housing for manual engagement to overcome the spring tension and release the binding action on said inner member.

2. In a structure of the character described, comprising an outer tubular member and an inner tubular member telescopically adjustable in one end of the outer tubular member, and means for securing said members in a desired position of telescopic adjustment, said means comprising a cup-shaped housing having diametrically opposed openings therein and surrounding the outer member at one end, a cap on said housing and through which the inner tubular member extends, a pair of diametrically opposed semi-circular segments surrounding said inner member and arranged in said cup-shaped housing at oblique angles relative to each other, a spring in said housing to normally urge said segments toward a common plane to cause their inner edges to bind on the outside surface of said inner member, and a finger piece on each of said segments each extending through one opening in said housing for manual engagement to overcome the spring tension and release the binding action on said inner member, said finger pieces being knurled.

3. In a structure of the character described, comprising an outer tubular member and an inner tubular member telescopically adjustable in one end of the outer tubular member, and means for securing said members in a desired position of telescopic adjustment, said means comprising a diametrically slotted cup-shaped housing surrounding the outer member at one end, the said housing including an outwardly extending sleeve secured to the outer tubular member, a cap on said housing and through which the inner tubular member extends, a pair of diametrically opposed semi-circular segments surrounding said inner member and arranged in said cup-shaped housing at oblique angles relative to each other, a spring in said housing to normally urge said segments toward a common plane to cause their inner edges to bind on the outside surface of said inner member, and a finger piece on each of said segments each extending through a slot in said housing for manual engagement to overcome the spring tension and release the binding action on said inner member.

4. In a structure of the character described, comprising an outer tubular member and an inner tubular member telescopically adjustable in one end of the outer tubular member, and means for securing said members in a desired position of telescopic adjustment, said means comprising a cup-shaped housing surrounding the outer member at one end and having diametrically opposed slots in the side wall thereof, the said housing including an outwardly extending sleeve secured to the outer tubular member, a flanged cap press fitted on said housing and through which the inner tubular member extends, the cap flange being of such width as to leave portions of said slots exposed, a pair of diametrically opposed semi-circular segments surrounding said inner member and arranged in said cup-shaped housing at oblique angles relative to each other, a spring in said housing to normally urge said segments toward a common plane to cause their inner edges to bind on the outside surface of said inner member, and a finger piece on each of said segments each extending through a slot in said housing for manual engagement to overcome the spring tension and release the binding action on said inner member.

5. In a structure of the character described, comprising an outer tubular member and an inner tubular member telescopically adjustable in one end of the outer tubular member, and means for securing said members in a desired position of telescopic adjustment, said means comprising an external annular flange on the telescoped end of the outer member, a peripheral wall on said flange extending beyond said outer member end, said peripheral wall having diametrically opposed slots opening onto the free edge thereof, a circumferentially flanged ring fitted over said peripheral wall and through which the inner tubular member extends, a pair of semi-circular plate-like segments arranged on the annular flange beneath said flanged ring, a spring interposed between said segments and said ring to retain the segments in binding-wedging engagement with the inner tubular member to prevent telescopic movement of said inner tubular member into the outer tubular member, and finger pieces one integral with each segment and one extending outwardly through each slot in said periperal flange engageable to move the segments against the tension of said spring and release the inner tubular member.

6. In a structure of the character described, comprising an outer tubular member and an inner tubular member telescopically adjustable in one end of the outer tubular member, and means for securing said members in a desired position of telescopic adjustment, said means comprising a hollow housing surrounding the inner tubular member at one end of the outer tubular member, a pair of semi-circular plate-like segments in said housing, means normally retaining said segments in binding-wedging engagement with the inner tubular member to prevent relative movement of said members in one direction, and means on said segments extending beyond the walls of said housing engageable to relieve said binding-wedging engagement.

JOS. P. MARX.

REFERENCES CITED

The following references are of record in the file of this patent:

UNITED STATES PATENTS

| Number | Name | Date |
|---|---|---|
| 216,282 | McHenry | June 10, 1879 |
| 388,195 | Hammond et al. | Aug. 21, 1888 |
| 836,303 | Christensen | Nov. 20, 1906 |
| 1,447,519 | Schade | Mar. 6, 1923 |
| 2,051,969 | Shastock | Aug. 25, 1936 |
| 2,090,550 | Pilblad | Aug. 17, 1937 |